(12) United States Patent
Hokuto et al.

(10) Patent No.: US 8,739,760 B2
(45) Date of Patent: Jun. 3, 2014

(54) CONTROL SYSTEM OF AN INTERNAL COMBUSTION ENGINE

(75) Inventors: Hiroyuki Hokuto, Numazu (JP); Tomohiro Shinagawa, Sunto-gun (JP); Nobuyuki Satake, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 312 days.

(21) Appl. No.: 13/262,705

(22) PCT Filed: Apr. 2, 2010

(86) PCT No.: PCT/JP2010/056085
§ 371 (c)(1),
(2), (4) Date: Oct. 3, 2011

(87) PCT Pub. No.: WO2010/114127
PCT Pub. Date: Oct. 7, 2010

(65) Prior Publication Data
US 2012/0024258 A1 Feb. 2, 2012

(30) Foreign Application Priority Data

Apr. 2, 2009 (JP) ................................ 2009-090043

(51) Int. Cl.
| | | |
|---|---|---|
| *F02M 25/07* | (2006.01) | |
| *F02B 3/00* | (2006.01) | |
| *F02D 41/30* | (2006.01) | |
| *F02D 11/10* | (2006.01) | |
| *F02D 41/40* | (2006.01) | |
| *F02D 41/00* | (2006.01) | |

(52) U.S. Cl.
CPC .......... *F02D 41/402* (2013.01); *F02D 41/3094* (2013.01); *F02D 41/0047* (2013.01); *F02D 11/10* (2013.01); *F02M 25/0786* (2013.01)
USPC ........... 123/299; 123/399; 123/431; 123/575; 123/568.19; 123/568.21

(58) Field of Classification Search
CPC ....... F02B 47/08; F02D 11/10; F02D 41/402; F02D 41/3094; F02D 41/0047; F02D 2009/0276; F02M 69/046; F02M 25/0786

USPC .......... 701/103–105, 108; 123/299, 300, 399, 123/27 GE, 431, 575, 525, 198 A, 568.11, 123/568.19, 568.21
See application file for complete search history.

(56) References Cited

U.S. PATENT DOCUMENTS 7,134,420 B2 * 11/2006 Miyashita ...................... 123/299
7,438,067 B2 * 10/2008 Saito et al. ..................... 123/697

FOREIGN PATENT DOCUMENTS

| JP | 11 148411 | 6/1999 |
| JP | 2004 60474 | 2/2004 |

(Continued)

OTHER PUBLICATIONS

International Search Report Issued May 18, 2010 in PCT/JP10/056085 filed Apr. 2, 2010.

*Primary Examiner* — Hai Huynh
(74) *Attorney, Agent, or Firm* — Oblon, Spivak, McClelland Maier & Neustadt, L.L.P.

(57) ABSTRACT

A control system of an internal combustion engine provided with a first fuel injection valve that injects fuel into a cylinder of the internal combustion engine, a second fuel injection valve that injects fuel into an intake port of the internal combustion engine, an EGR passage that introduces an EGR gas from an exhaust passage of the internal combustion engine to an intake passage thereof, an EGR valve that is arranged in the EGR passage, and an obtaining unit that obtains an amount of intake air in the internal combustion engine. When the EGR valve is open, a determination is made as to whether the amount of intake air is in an increasing tendency or in a decreasing tendency with respect to a change in the cylinder injection ratio, and a value of the amount of intake air thus obtained is corrected based on the determination.

11 Claims, 11 Drawing Sheets

(56) References Cited

FOREIGN PATENT DOCUMENTS

| JP | 2004 270583 | 9/2004 |
| JP | 2006 226163 | 8/2006 |
| JP | 2006 336621 | 12/2006 |
| JP | 2007 40205 | 2/2007 |

* cited by examiner

CONTROL SYSTEM OF AN INTERNAL COMBUSTION ENGINE

INCORPORATION BY REFERENCE

The disclosure of International Application No. PCT/JP2010/056085 filed on Apr. 2, 2010; and Japanese Patent Application No. 2009-090043 filed on Apr. 2, 2009, including the specification, drawings, and abstract is incorporated herein by reference in their entireties.

TECHNICAL FIELD

The present invention relates to a control system of an internal combustion engine which is provided with a fuel injection valve for injecting fuel into a cylinder, and a fuel injection valve for injecting fuel into an intake port.

BACKGROUND ART

In a first patent document, there is described a technique in which, in an internal combustion engine provided with a first fuel injection valve for injecting fuel into a cylinder, and a second fuel injection valve for injecting fuel into an intake port, the charging efficiency of intake air is enhanced by making higher an injection ratio of the first fuel injection valve with respect to the second fuel injection valve, when the engine speed is low.

In a second patent document, there is described a technique in which, in an internal combustion engine provided with a fuel injection valve for injecting fuel into a cylinder, intake air in the cylinder is cooled by decreasing an amount of fuel injected from the fuel injection valve per unit time.

In a third patent document, there is described a technique in which, in an internal combustion engine provided with a fuel injection valve for injecting fuel into a cylinder and an EGR mechanism, an injection rate of the fuel injection valve is detected, and a target EGR rate is corrected based on the injection rate thus detected.

PRIOR ART DOCUMENTS

Patent Documents

Patent Document 1: Japanese Patent Application Laid-Open No. 2004-270583
Patent Document 2: Japanese Patent Application Laid-Open No. 2007-40205
Patent Document 3: Japanese Patent Application Laid-Open No. 11-148411

DISCLOSURE OF THE INVENTION

Problem to be Solved by the Invention

However, at a transient time in which the injection ratio of the first fuel injection valve and the second fuel injection valve changes, an amount of intake air obtained by an air flow meter or the like may be different from an actual amount of intake air.

In the above-mentioned case, when control parameters such as an amount of fuel injection, etc., are determined according to the value of the amount of intake air thus obtained, a decrease in combustion stability and an increase in exhaust emissions may be caused. Therefore, it is necessary to correct the obtained value of the amount of intake air according to a change in the injection ratio, or to correct the target values of the control parameters determined according to the obtained value of the amount of intake air.

However, it has been found out that in internal combustion engines each having an EGR mechanism which recirculates a part of the exhaust gas (an EGR gas) from an exhaust passage to an intake passage, the amount of intake air does not increase and decrease in a uniform manner in response to a change in the injection ratio.

The present invention has been made in view of the various circumstances as referred to above, and has for its object to provide a technique which is capable of obtaining an accurate amount of intake air in a control system of an internal combustion engine which is provided with a first fuel injection valve for injecting fuel into a cylinder, a second fuel injection valve for injecting fuel into an intake port, and an EGR mechanism.

Means for Solving the Problem

In order to solve the above-mentioned problems, the present invention resides in a control system of an internal combustion engine which is provided with a first fuel injection valve that injects fuel into a cylinder of the internal combustion engine, a second fuel injection valve that injects fuel into an intake port of the internal combustion engine, an EGR passage that introduces an EGR gas from an exhaust passage of the internal combustion engine to an intake passage thereof, an EGR valve that is arranged in the EGR passage, and an obtaining unit that obtains a value which is correlated with an amount of intake air in the internal combustion engine, wherein during the time when the EGR valve is open, a determination is made based on a value of a cylinder injection ratio, as to whether the amount of intake air is in an increasing tendency or in a decreasing tendency with respect to a change in the cylinder injection ratio, and the value obtained by said obtaining unit is corrected according to a result of the determination.

The cylinder injection ratio referred to herein represents a ratio of an amount of fuel injected from the first fuel injection valve with respect to a total amount of fuel injected from the first fuel injection valve and the second fuel injection valve. In addition, the value correlated with the amount of intake air is a value that is measured by a sensor such as an air flow meter, or a control parameter that is determined according to a value measured by a sensor such as an air flow meter (for example, a degree of opening of a throttle valve, a degree of opening of the EGR valve, an amount of fuel injection of the first fuel injection valve, an amount of fuel injection of the second fuel injection valve, the cylinder injection ratio, ignition timing, a valve opening characteristic of an intake valve, and so on).

As a result of keen and earnest experiments and verification carried out by inventors of the present application, it has been found out that in an EGR operating range (an operating range in which the EGR valve is open), there exist an operating range in which the tendency of change of the amount of intake air with respect to a change in the cylinder injection ratio varies according to the value of the cylinder injection ratio.

That is, in the EGR operating range, there exists an operating range in which an increasing or decreasing tendency of the amount of intake air with respect to a change in the cylinder injection ratio varies on the boundary of a specific cylinder injection ratio (hereinafter referred to as a "specific ratio"). In such an operating range, when the cylinder injection ratio is lower than the specific ratio, the amount of intake air decreases with respect to an increase in the cylinder injection ratio, whereas when the cylinder injection ratio is not lower than the specific ratio, the amount of intake air increases with respect to an increase in the cylinder injection ratio.

Accordingly, a control system of an internal combustion engine according to the present invention is provided with:

a first fuel injection valve that injects fuel into a cylinder of the internal combustion engine;

a second fuel injection valve that injects fuel into an intake port of the internal combustion engine;

a throttle valve that is arranged in an intake passage of the internal combustion engine;

an EGR passage that introduces an EGR gas from an exhaust passage of the internal combustion engine to the intake passage at a location downstream of said throttle valve;

an EGR valve that is arranged in the EGR passage;

an obtaining unit that obtains an amount of intake air in the internal combustion engine;

a determination unit that determines, based on a cylinder injection ratio which is a ratio of an amount of fuel injected from said first fuel injection valve to a total amount of fuel injected from said first fuel injection valve and said second fuel injection valve, whether the amount of intake air is in an increasing tendency or in a decreasing tendency with respect to a change in the cylinder injection ratio, when said EGR valve is open; and a correction unit that corrects the amount of intake air obtained by said obtaining unit, according to a result of the determination of said determination unit.

According to this invention, it is determined whether the amount of intake air is in an increasing tendency or in a decreasing tendency with respect to a change in the cylinder injection ratio. For example, in cases where the cylinder injection ratio is lower than the above-mentioned specific ratio, a determination is made that the amount of intake air is in a decreasing tendency with respect to an increase in the cylinder injection ratio. On the other hand, in cases where the cylinder injection ratio is not lower than the above-mentioned specific ratio, a determination is made that the amount of intake air is in an increasing tendency with respect to an increase in the cylinder injection ratio. When the obtained value of the amount of intake air is corrected based on such a result of the determination, even in cases where the cylinder injection ratio changes in the EGR operating range, it becomes possible to obtain an accurate amount of intake air.

The obtaining unit according to the present invention may be a sensor that detects a physical quantity which is correlated with the amount of intake air, such as an air flow meter, an intake air pressure sensor, or the like. In addition, the obtaining unit according to the present invention may be an ECU that calculates an amount of intake air per cylinder from a detection value of the above-mentioned sensor.

The correction unit according to the present invention may correct the detection value of the air flow meter, the intake pressure sensor, or the like. Alternatively, the amount of intake air calculated by the ECU may be corrected.

According to the present invention, it also becomes possible to change a target value of a control parameter related to the operating state of the internal combustion engine, according to the accurate amount of intake air. The control parameter in that case is, for example, a degree of opening of the throttle valve, a degree of opening of the EGR valve, a total amount of fuel (a sum total of an amount of fuel injection of the first fuel injection valve and an amount of fuel injection of the second fuel injection valve), the cylinder injection ratio, ignition timing, a valve opening characteristic of an intake valve, or the like.

In cases where the control parameter is the degree of opening of the throttle valve, or the degree of opening of the EGR valve, a target value of the degree of opening of the throttle valve or a target value of the degree of opening of the EGR valve may be changed in such a manner that an actual amount of intake air is in match with a target amount of intake air (or the amount of EGR gas is in match with a target amount of EGR gas).

In cases where the control parameter is the total amount of fuel, a target value of the total amount of fuel may be changed in such a manner that the air fuel ratio of an air fuel mixture becomes a target air fuel ratio.

In cases where the control parameter is the cylinder injection ratio, a target value of the cylinder injection ratio may be changed in such a manner that an actual amount of intake air is in match with a target amount of intake air (or an actual amount of EGR gas is in match with a target amount of EGR gas).

In cases where the control parameter is ignition timing, a target value of the ignition timing may be changed in such a manner that the occurrence of misfire or knocking is prevented or the torque generated by the internal combustion engine is in match with a target torque.

In cases where the control parameter is the valve opening characteristic of the intake valve, a target value of the valve opening characteristic of the intake valve may be changed in such a manner that an actual amount of intake air is in match with a target amount of intake air (or an actual amount of EGR gas is in match with a target amount of EGR gas).

When the target value of the control parameter is changed in the manner as described above, it is possible to suppress a decrease in combustion stability, an increase and a decrease of the torque, an increase in exhaust emissions, etc., resulting from a change in the cylinder injection ratio.

Here, note that a control system of an internal combustion engine of the present invention may correct the target value of the control parameter, instead of correcting the amount of intake air obtained by the obtaining unit. In that case, the target value of the control parameter becomes a value suitable for the actual amount of intake air. As a result, it is possible to suppress a decrease in combustion stability, an increase and a decrease of the torque, an increase in exhaust emissions, etc., resulting from a change in the cylinder injection ratio.

In the present invention, the operating range in which the increasing or decreasing tendency of the amount of intake air with respect to a change in the cylinder injection ratio varies according to the value of the cylinder injection ratio is, for example, an operation range in which the degree of opening of the throttle valve (hereinafter referred to as a "throttle opening degree") is not more than a predetermined throttle opening degree, and the degree of opening of the EGR valve (hereinafter referred to as an "EGR valve opening degree") is not less than a predetermined EGR valve opening degree.

In a first operating range (for example, a low load and low speed operating range) in which a throttle loss due to the throttle valve becomes relatively small with respect to a throttle loss due to the EGR valve, the higher the cylinder injection ratio, the more the amount of intake air decreases (the amount of EGR gas increases).

In a second operating range (for example, a high load and high speed operating range) in which there is almost no throttle loss due to the throttle valve, the higher the cylinder injection ratio, the more the amount of intake air increases. Here, note that the amount of EGR gas becomes a substantially constant amount without regard to the cylinder injection ratio.

In a third operating range (for example, a medium load and medium speed operating range) in which a throttle loss due to the throttle valve and a throttle loss due to the EGR valve are approximate to each other, in cases where the cylinder injection ratio is lower than the specific ratio, the higher the cylinder injection ratio, the more the amount of intake air decreases (the amount of EGR gas increases). On the other hand, in cases where the cylinder injection ratio is not lower than the specific ratio, the higher the cylinder injection ratio, the more the amount of intake air increases (the amount of EGR gas maintains a substantially constant amount).

Therefore, the operating range, in which the throttle opening degree becomes not more than the predetermined throttle opening degree and the EGR valve opening degree becomes not less than the predetermined EGR valve opening degree, corresponds to the above-mentioned third operating range. Accordingly, the predetermined throttle opening degree and the predetermined EGR valve opening degree should just be set so as to satisfy the degrees of opening which the throttle valve and the EGR valve can take in the above-mentioned third operating range, respectively.

Here, note that the throttle opening degree and the EGR valve opening degree are determined based on an engine load and a engine speed. For that reason, a determination may be made as to whether the engine load and the engine speed fall within the above-mentioned third operating range, instead of determining whether the relation between the throttle opening degree and the EGR valve opening degree falls within the above-mentioned third operating range.

In that case, a control system of an internal combustion engine according to the present invention may be provided with a storage unit that stores beforehand the relation between the throttle opening degree and the EGR valve opening degree or the relation between the engine load and the engine speed, at the time when the operating state of the internal combustion engine falls within the above-mentioned third operating range.

Incidentally, the above-mentioned specific ratio varies according to the specifications of the internal combustion engine. For that reason, it is desirable to obtain beforehand the above-mentioned specific ratio for each internal combustion engine experimentally.

Next, a control system of an internal combustion engine according to the present invention may be provided with:

a first fuel injection valve that injects fuel into a cylinder of the internal combustion engine;

a second fuel injection valve that injects fuel into an intake port of the internal combustion engine;

a throttle valve that is arranged in an intake passage of the internal combustion engine;

an EGR passage that introduces an EGR gas from an exhaust passage of the internal combustion engine to the intake passage at a location downstream of said throttle valve;

an EGR valve that is arranged in the EGR passage;

a first obtaining unit that obtains an amount of intake air in the internal combustion engine;

a second obtaining unit that obtains an amount of EGR gas based on the amount of intake air obtained by said first obtaining unit, a determination unit that determines, based on a cylinder injection ratio which is a ratio of an amount of fuel injected from said first fuel injection valve to a total amount of fuel injected from said first fuel injection valve and said second fuel injection valve, whether the amount of EGR gas is in an increasing tendency or in a decreasing tendency with respect to a change in the cylinder injection ratio, when said EGR valve is open; and a correction unit that corrects the amount of EGR gas obtained by said second obtaining unit, according to a result of the determination of said determination unit.

According to this invention, a determination is made based on the cylinder injection ratio as to whether the amount of EGR gas is in an increasing tendency or in a decreasing tendency, and the obtained value of the amount of EGR gas is corrected according to the result of the determination. As a result, even if the cylinder injection ratio changes in the EGR operating range, it becomes possible to obtain an accurate amount of EGR gas.

When the accurate amount of EGR gas is obtained, it becomes possible to determine whether the amount of EGR gas is converging to its target value. As a result, it also becomes possible to change the target value of the control parameter in such a manner that the amount of EGR gas converges to the target value.

Effects of the Invention

According to the present invention, it becomes possible to obtain an accurate amount of intake air in a control system of an internal combustion engine which is provided with a first fuel injection valve for injecting fuel into a cylinder, a second fuel injection valve for injecting fuel into an intake port, and an EGR mechanism.

THE BEST MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
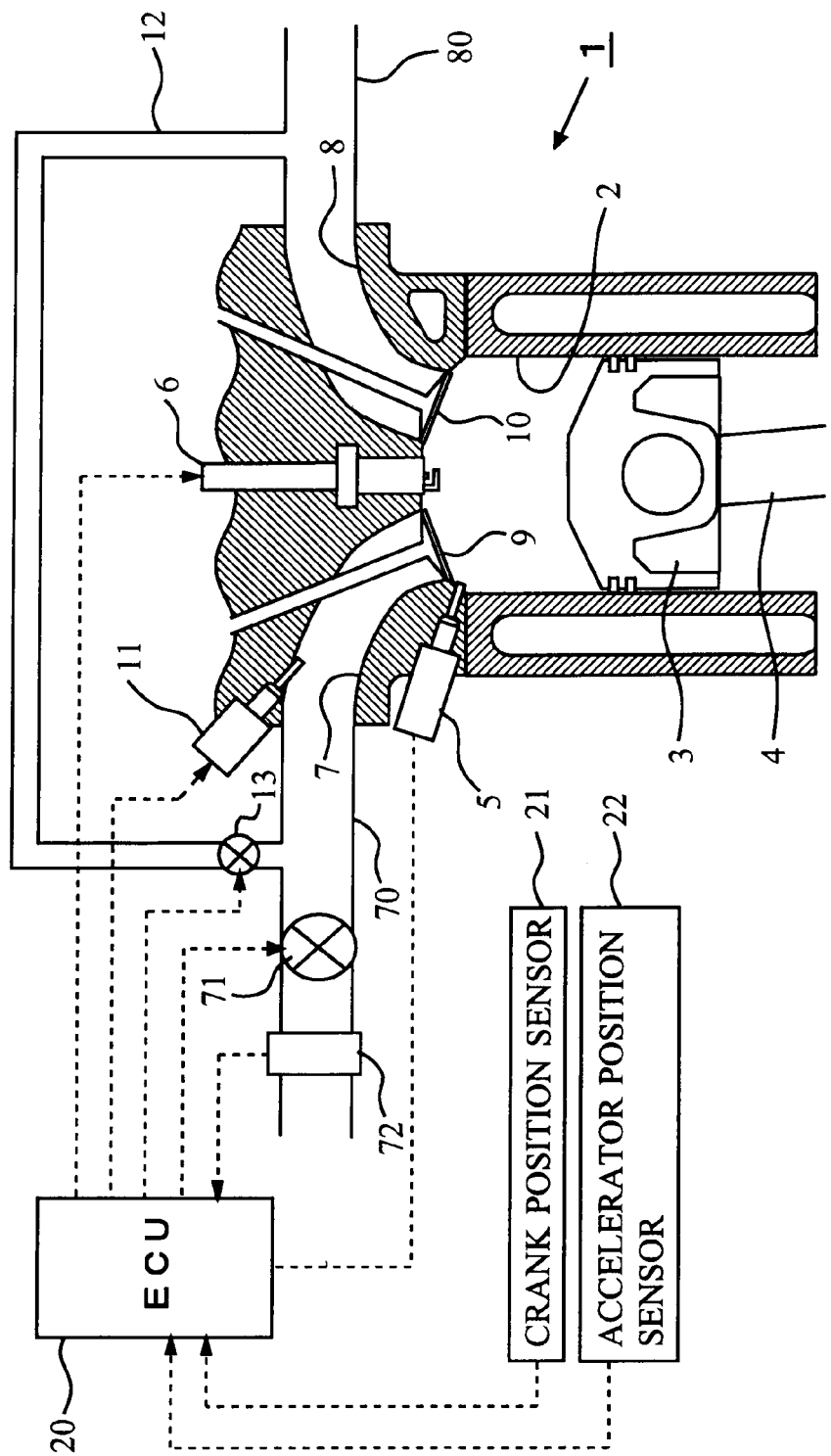
FIG. 1 is a view showing the schematic construction of an internal combustion engine to which the present invention is applied.

First, reference will be made to a first embodiment of the present invention based on FIGS. 1 through 10. FIG. 1 is a view showing the schematic construction of an internal combustion engine to which the present invention is applied.

An internal combustion engine 1 shown in FIG. 1 is a four-stroke cycle spark ignition internal combustion engine (gasoline engine) provided with a plurality of cylinders. Here, note that in FIG. 1, only one cylinder among the plurality of cylinders is illustrated.

A piston 3 is fitted in each cylinder 2 of the internal combustion engine 1 for sliding movement relative thereto. The piston 3 is connected with an unillustrated engine output shaft (crankshaft) through a connecting rod 4. In addition, a spark plug 6 for injecting fuel into a cylinder and a first fuel injection valve 5 for igniting an air fuel mixture in the cylinder are mounted on each cylinder 2.

The inside of each cylinder 2 is in communication with an intake port 7 and an exhaust port 8. An open end of the intake port 7 in each cylinder 2 is opened and closed by means of an intake valve 9. An open end of the exhaust port 8 in each cylinder 2 is opened and closed by means of an exhaust valve 10. The intake valve 9 and the exhaust valve 10 are driven to open and close by means of an unillustrated intake cam and an unillustrated exhaust cam, respectively.

The above-mentioned intake port 7 is in communication with an intake passage 70. A throttle valve 71 is arranged in the intake passage 70. An air flow meter 72 is arranged in the intake passage 70 at a location upstream of the throttle valve 71. The air flow meter 72 is a sensor that outputs an electrical signal corresponding to a mass of intake air flowing in the intake passage 70, and it corresponds to an obtaining unit of the present invention. In each intake port 7 or the intake passage 70, there is arranged a second fuel injection valve 11 for injecting fuel into the intake port 7.

The above-mentioned exhaust port 8 is in communication with an exhaust passage 80. The exhaust passage 80 is opened into atmospheric air by the way of an unillustrated catalyst (for example, a three-way catalyst, a NOx storage reduction catalyst, a NOx selective reduction catalyst, etc.) and a silencer. A base end of an EGR passage 12 is connected to the exhaust passage 80. A terminal end of the EGR passage 12 is connected to the intake passage 70 at a location downstream of the throttle valve 71. The EGR passage 12 is a passage which serves to introduce a part of an exhaust gas (EGR gas) flowing through the exhaust passage 80 to the intake passage 70. An EGR valve 13 for changing the channel cross section of the EGR passage 12 is arranged in the EGR passage 12 at a location between the opposite ends thereof.

An ECU 20 is provided in combination with the internal combustion engine 1 as constructed in this manner. The ECU 20 is an electronic control unit which is composed of a CPU, a ROM, a RAM, a backup RAM, and so on. Detection signals of various sensors such as a crank position sensor 21 and an accelerator position sensor 22, in addition to a detection signal of the above-mentioned air flow meter 72, are input to the ECU 20. Moreover, the ECU 20 electrically controls the first fuel injection valve 5, the spark plug 6, the second fuel injection valve 11, the EGR valve 13, and the throttle valve 71.

For example, the ECU 20 determines amounts of fuel to be injected from the first fuel injection valve 5 and the second fuel injection valve 11, respectively, and controls the first fuel injection valve 5 and the second fuel injection valve 11 according to the amounts of fuel thus determined, respectively.

More specifically, the ECU 20 calculates an amount of fuel (a total amount of fuel) which should be supplied to each cylinder 2, according to the detection signals of the air flow meter 72, the crank position sensor 21, the accelerator position sensor 22, and so on. Subsequently, the ECU 20 calculates an injection ratio between the first fuel injection valve 5 and the second fuel injection valve 11 according to the detection signals of the crank position sensor 21 and the accelerator position sensor 22, and controls the first fuel injection valve 5 and the second fuel injection valve 11 according to the result of the calculation.

Figure 2:
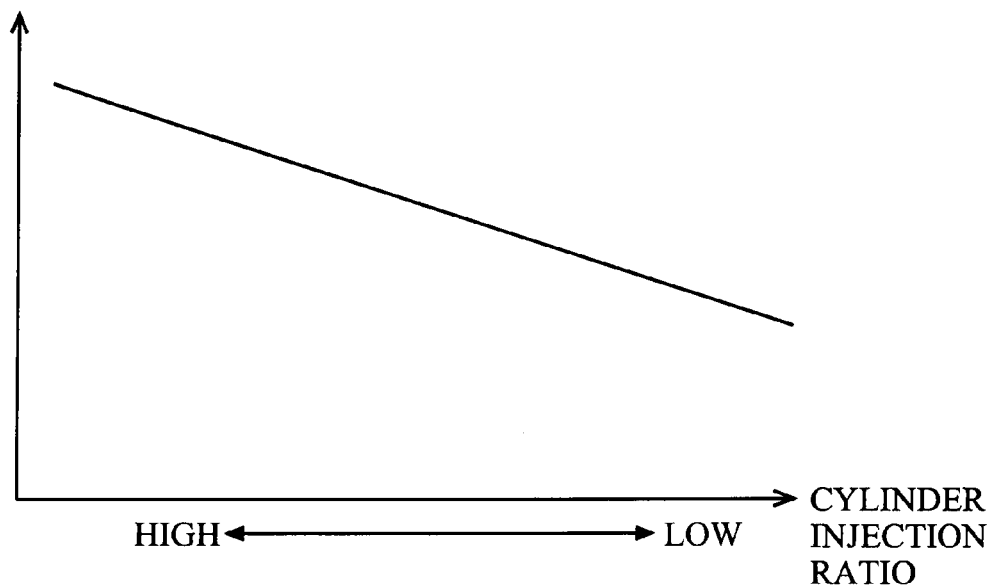
FIG. 2 is a view showing the relation between a cylinder injection ratio and an amount of intake air in an EGR non-operating range.

Here, when the injection ratio (cylinder injection ratio) of the first fuel injection valve 5 increases, the amount of fresh air (air) sucked into each cylinder 2 increases, as shown in FIG. 2. This is considered to be due to the fact that an increase in the latent heat of vaporization of the fuel injected into a cylinder 2 causes the volume of the gas in the cylinder to decrease and at the same time the internal pressure in the cylinder to fall. Therefore, at the time of low speed and low load operation of the engine in which the inertia effect of intake air is small, the charging efficiency of the fresh air (air) can be made higher by increasing the cylinder injection ratio.

Incidentally, at the time of transient operation of the engine in which the cylinder injection ratio changes, a change in the amount of the fresh air (air) sucked into a cylinder 2 may not be reflected on the detection value of the air flow meter 72. For this reason, the detection value of the air flow meter 72 may be different from an actual amount of intake air.

On the other hand, there can be considered a method in which the amount of change of the fresh air (air) with respect to the change of the cylinder injection ratio has beforehand been obtained experimentally, so that the detection value of the air flow meter 72 is corrected according to the amount of change thus obtained.

However, as a result of keen and earnest experiments and verification carried out by inventors of the present application, it has been found out that at the time of introduction of the EGR gas (i.e., at the time of opening of the EGR valve 13), the amount of intake air does not change uniformly with respect to the change of the cylinder injection ratio.

Figure 3:
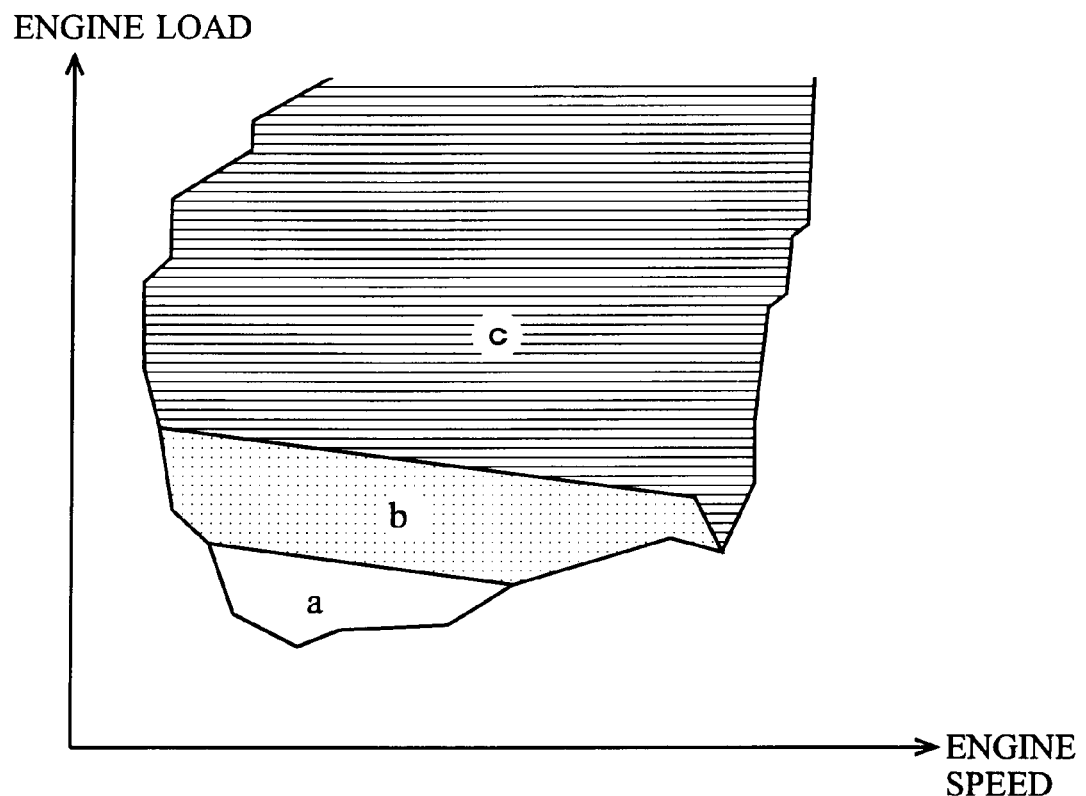
FIG. 3 is a view showing the relation between an engine load, a engine speed and an EGR operating range.
Figure 6:
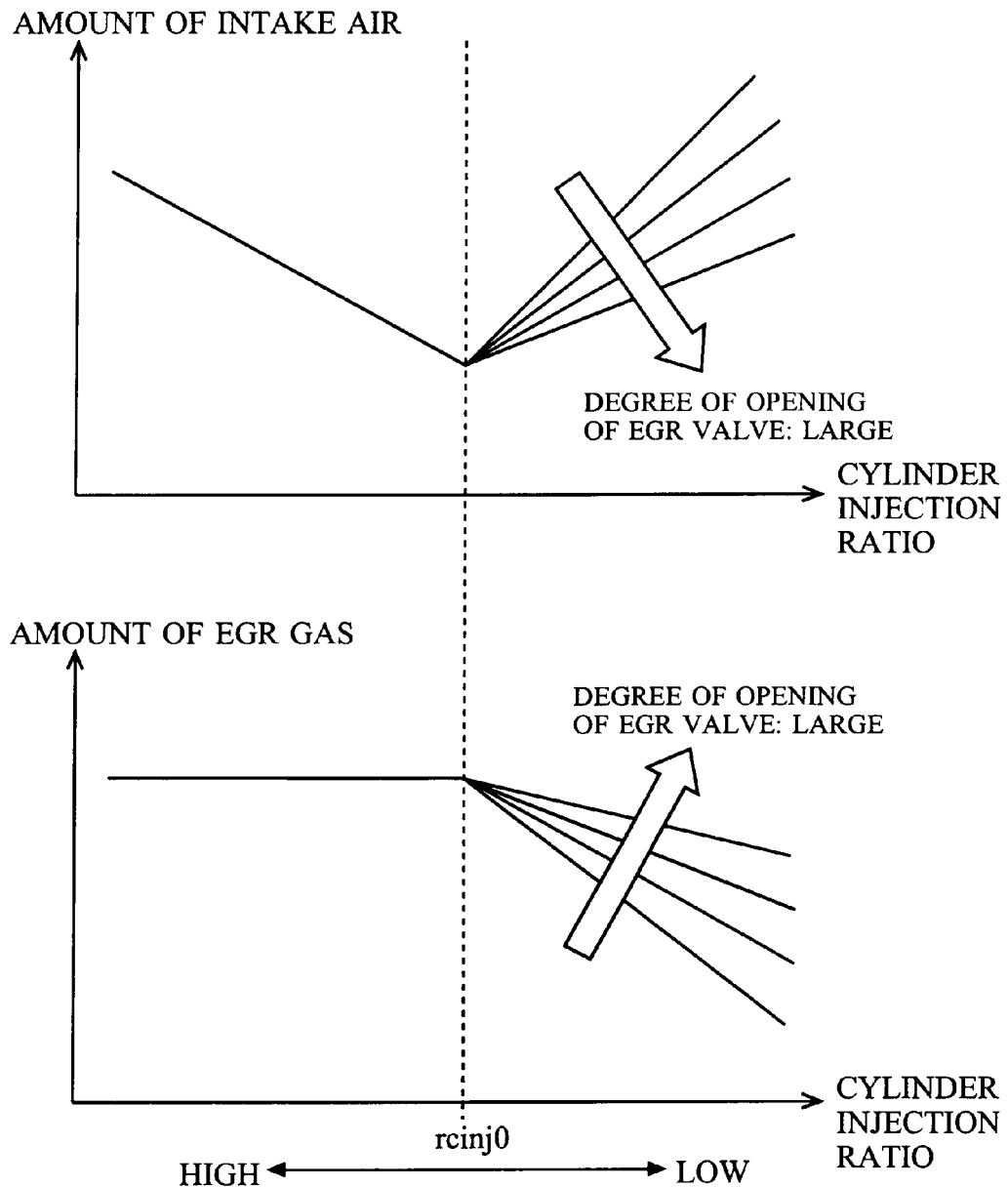
FIG. 6 is a view showing the increasing or decreasing tendencies of an amount of intake air and an amount of EGR gas with respect to a change in a cylinder injection ratio in a range b in FIG. 3.

Here, reference will be made to an increasing and decreasing tendency of the amount of intake air in an EGR operating range, based on FIG. 3 or FIG. 6. FIG. 3 is a view showing the EGR operating range. In FIG. 3, the EGR operating range is divided into three ranges a, b and c.

Figure 4:
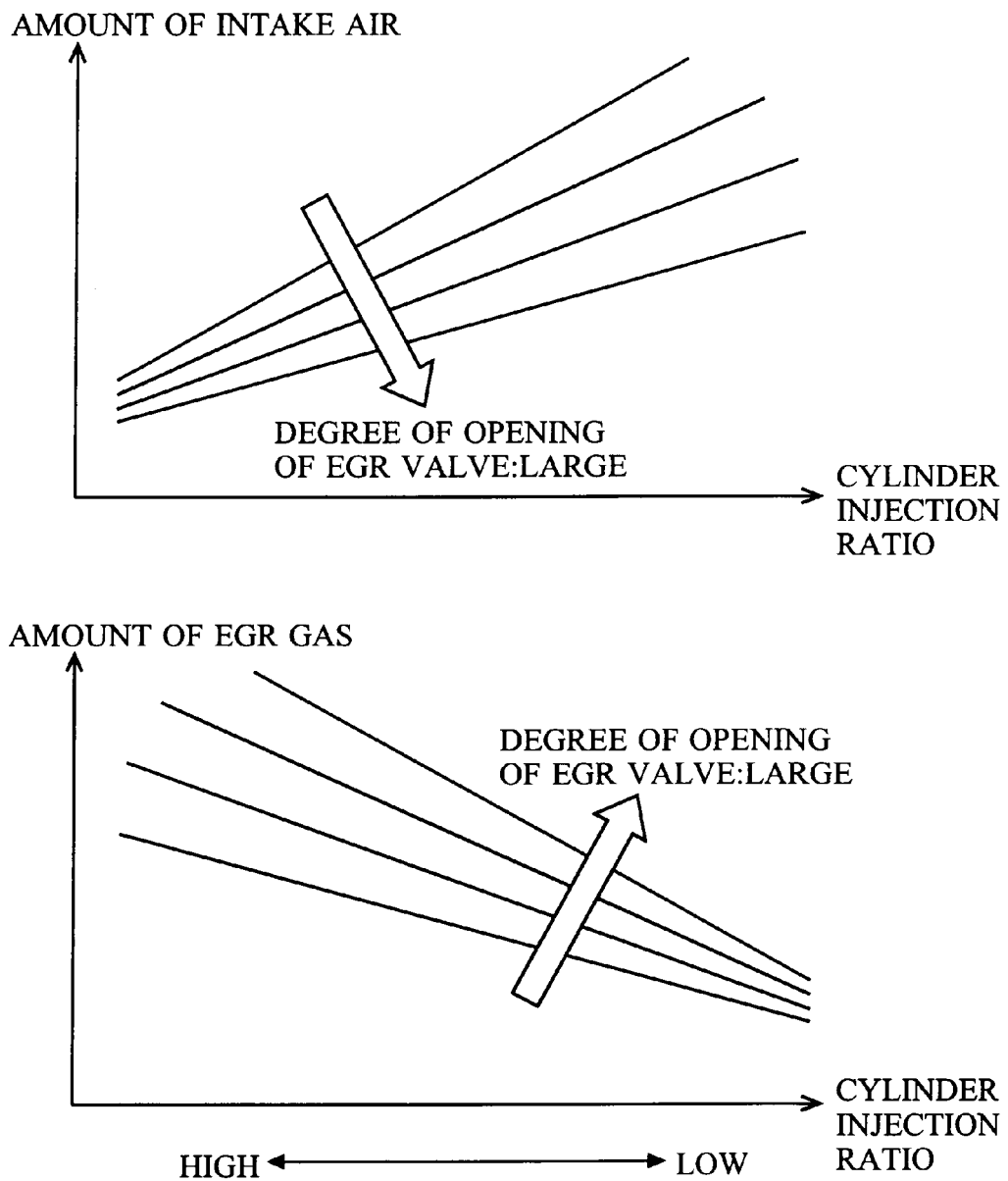
FIG. 4 is a view showing the increasing or decreasing tendencies of an amount of intake air and an amount of EGR gas with respect to a change in a cylinder injection ratio in a range a in FIG. 3.

The range a in FIG. 3 is a operating range in which an engine load (the degree of opening of an accelerator pedal) is high and in which the engine speed is low. In the range a, the amount of intake air decreases as shown in FIG. 4, so that a cylinder injection ratio becomes high, and, so that the degree of opening of the EGR valve 13 becomes large (the amount of EGR gas increases). This is considered to be because a throttle loss due to the throttle valve 71 becomes larger with respect to the throttle loss of the EGR valve 13.

Figure 5:
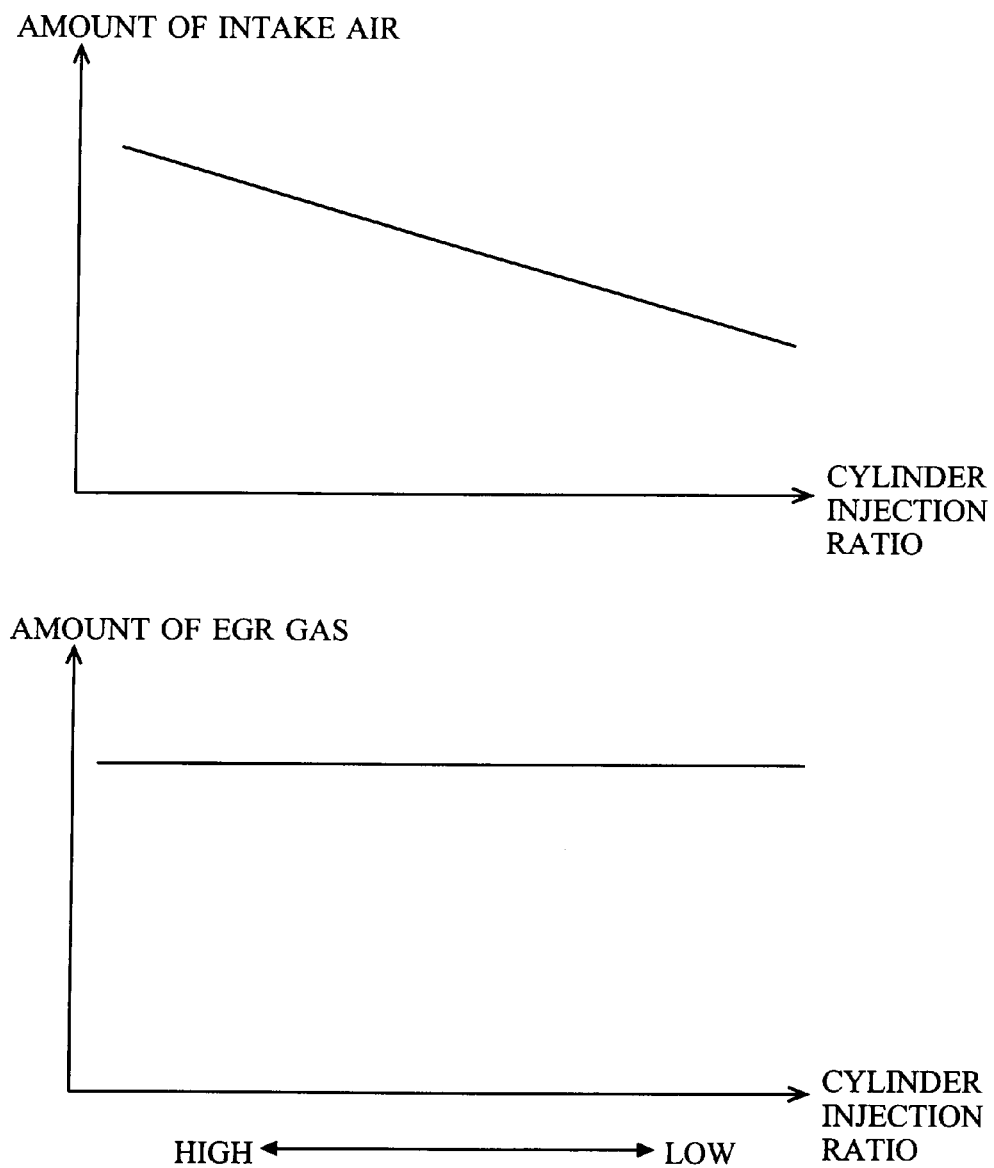
FIG. 5 is a view showing the increasing or decreasing tendencies of an amount of intake air and an amount of EGR gas with respect to a change in a cylinder injection ratio in a range c in FIG. 3.

The range c in FIG. 3 is an operating range in which the engine load is high and in which the engine speed is high. In the range c, as shown in FIG. 5, the amount of EGR gas becomes a substantially constant value irrespective of the cylinder injection ratio. The higher the cylinder injection ratio, the larger the amount of intake air becomes. This tendency is substantially constant irrespective of the degree of opening of the EGR valve 13. This is considered due to the fact that the throttle loss due to the throttle valve 71 becomes smaller with respect to the throttle loss due to the EGR valve 13, and at the same time the inertia force of intake air becomes large.

The range b in FIG. 3 is a medium range between the range a and the range c, and is a so-called medium load and medium speed operating range. In the range b, in a range in which the cylinder injection ratio becomes lower than a specific ratio rcinj0, the higher the cylinder injection ratio and the larger the degree of opening of the EGR valve 13, the more the amount of intake air decreases (i.e., the amount of EGR gas increases), as shown in FIG. 6. On the other hand, in a range in which the cylinder injection ratio becomes not less than the specific ratio rcinj0, the higher the cylinder injection ratio, the more the amount of intake air increases (i.e., the amount of EGR gas becomes a substantially constant value irrespective of the cylinder injection ratio). This tendency is substantially constant irrespective of the degree of opening of the EGR valve 13. Here, note that the range b in FIG. 3 corresponds to an operating range in which "the degree of opening of the throttle valve becomes not more than a predetermined throttle opening degree and the degree of opening of the EGR valve becomes not less than a predetermined EGR valve opening degree", according to the present invention.

Accordingly, the ECU 20 first determines within which of the above-mentioned three operating ranges a, b and c, the operating state of the internal combustion engine 1 falls. In that case, the range of each of the above-mentioned three ranges a, b, c and the value of the specific ratio rcinj0 vary according to the specifications of the internal combustion engine. For that reason, the range of each of the ranges a, b, c and the value of the specific ratio rcinj0 should be experimentally obtained beforehand.

Subsequently, the ECU 20 identifies, based on the range thus determined, an increasing or decreasing tendency of the amount of intake air with respect to the change of the cylinder injection ratio. The ECU 20 corrects the detection value of the air flow meter 72 based on the increasing or decreasing tendency of the amount of intake air.

Figure 7:
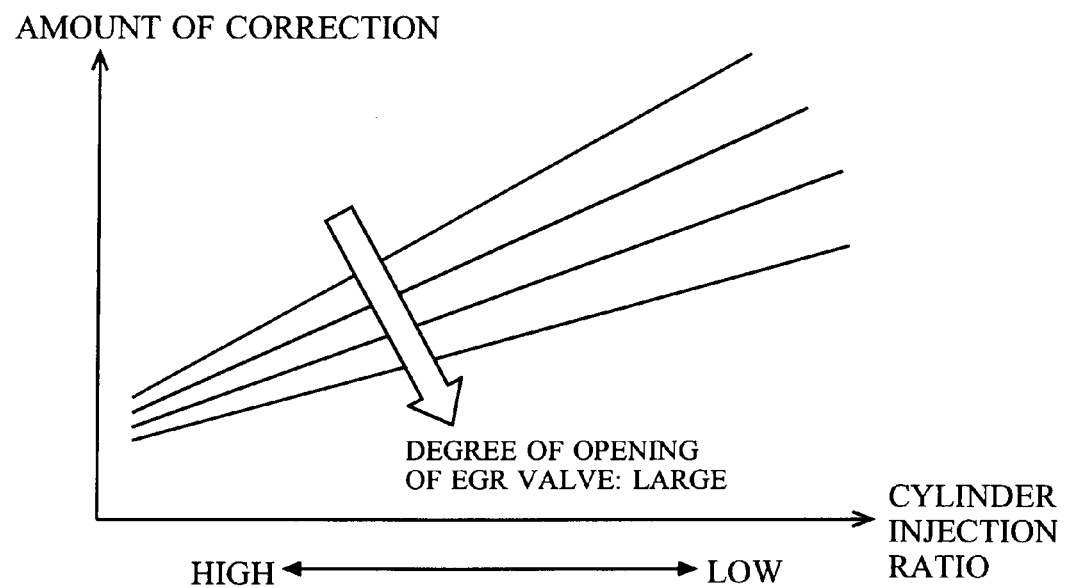
FIG. 7 is a view showing the relation between a cylinder injection ratio and an amount of intake air in the range a in FIG. 3.

It is preferable that an amount of correction (i.e., an increase or decrease) at that time be obtained in advance through experiments, etc. For example, the amount of correction in the range a should be set in such a manner that the higher the cylinder injection ratio and the larger the degree of opening of the EGR valve 13, the smaller the amount of correction in the range a becomes, as shown in FIG. 7. Also, the amount of correction in the range c should be set in such a manner that the higher the cylinder injection ratio, the larger the amount of correction in the range c becomes, as shown in FIG. 8.

Figure 9:
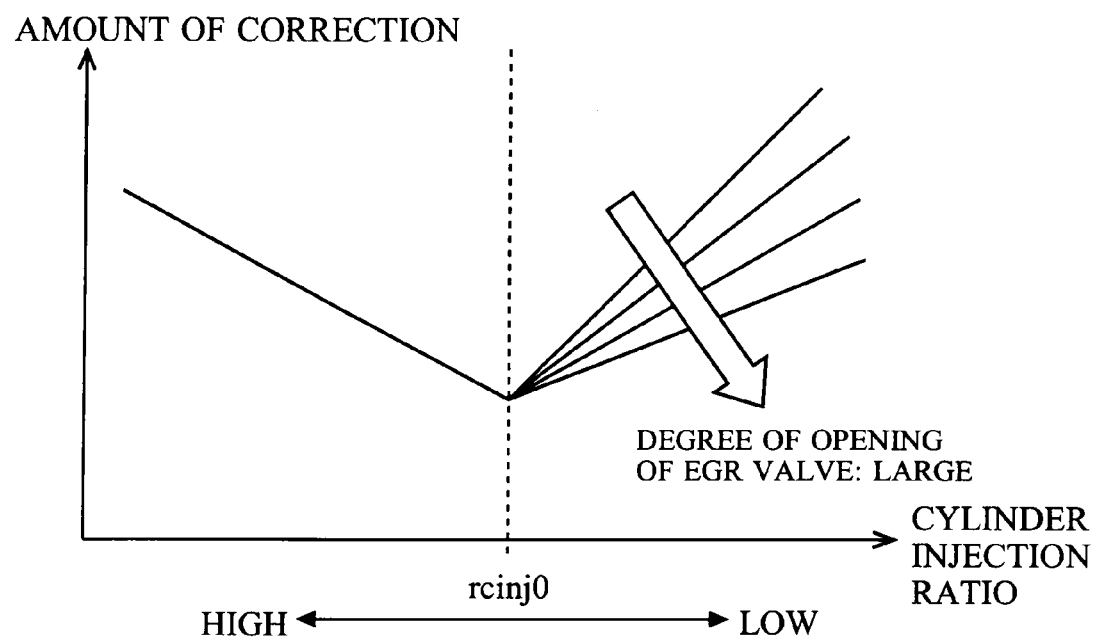
FIG. 9 is a view showing the relation between a cylinder injection ratio and an amount of intake air in the range b in FIG. 3.

The amount of correction in the range b should be set in such a manner that when the cylinder injection ratio is lower than the specific ratio rcinj0, the higher the cylinder injection ratio and the larger the degree of opening of the EGR valve 13, the smaller the amount of correction in the range b becomes, as shown in FIG. 9. Also, the amount of correction in the range b should be set such that when the cylinder injection ratio is not lower than the specific ratio rcinj0, the higher the cylinder injection ratio, the larger the amount of correction becomes.

Figure 8:
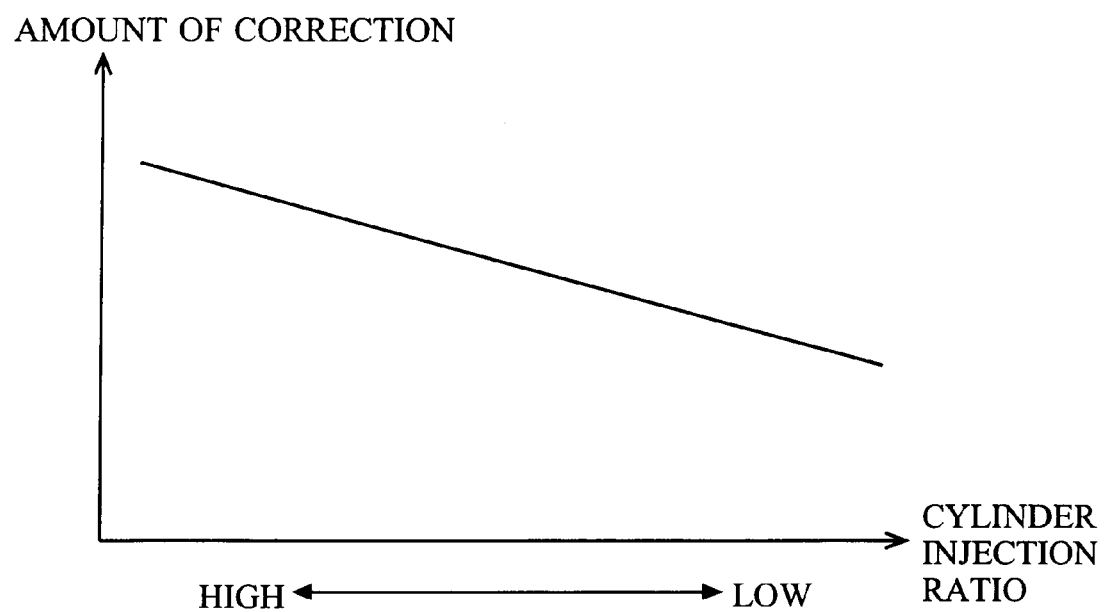
FIG. 8 is a view showing the relation between a cylinder injection ratio and an amount of intake air in the range c in FIG. 3.

The ECU 20 can obtain the actual amount of intake air in an accurate manner by correcting the detection value of the air flow meter 72 according to the amounts of correction shown in the above-mentioned FIGS. 7 through 9. As a result, it also becomes possible for the ECU 20 to change the target values of various kinds of control parameters (the throttle opening degree, the EGR valve opening degree, a total amount of fuel, the cylinder injection ratio, ignition timing, the valve opening characteristic of an intake valve, etc.) based on the actual amount of intake air. In that case, the ECU 20 may carry out not only the processing of adjusting the various kinds of control parameters to values suitable for the actual amount of intake air, but also the processing of changing the various kinds of control parameters so that the actual amount of intake air matches a target amount of intake air.

Figure 10:
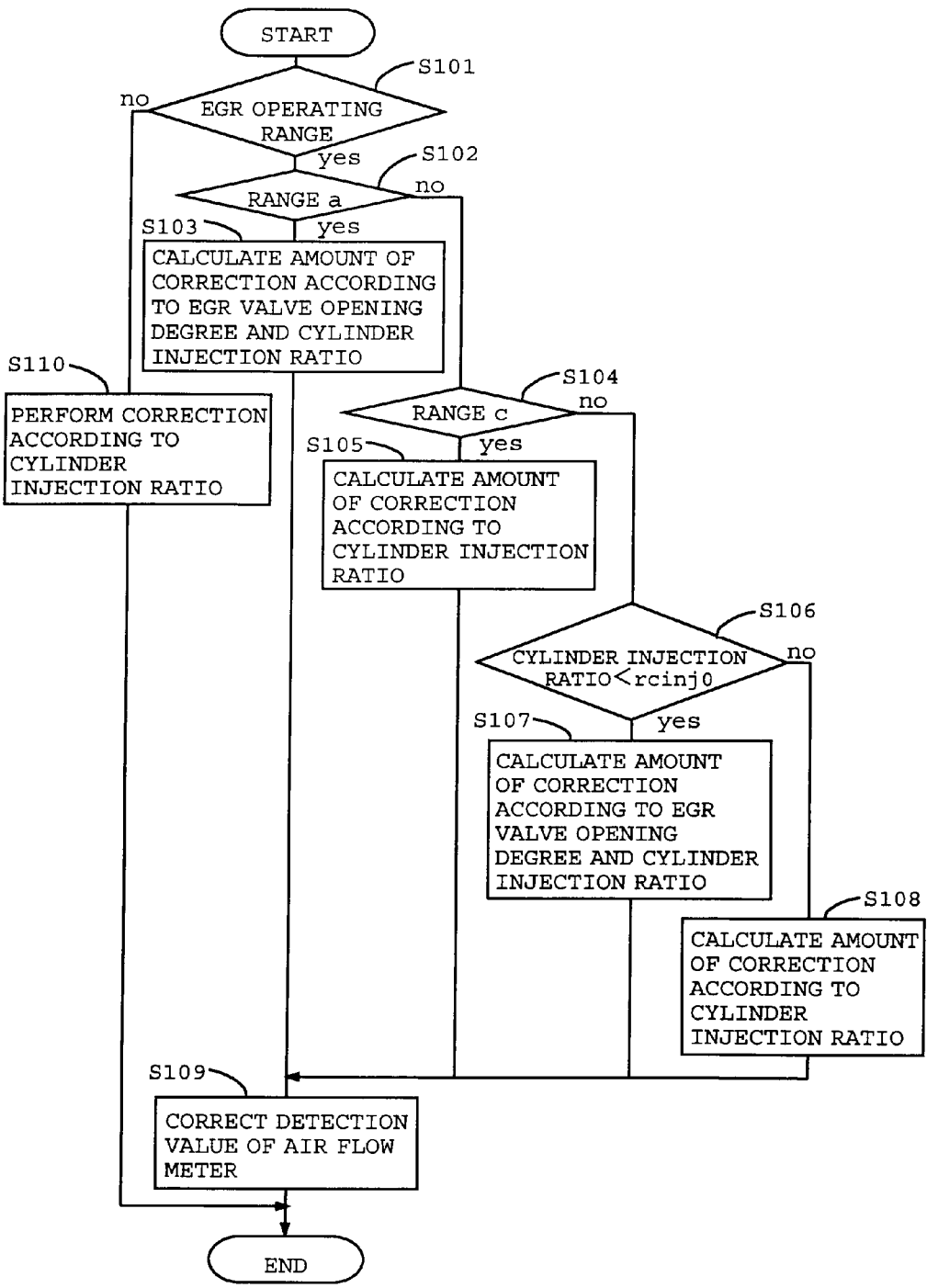
FIG. 10 is a flow chart showing a correction control routine for correction of an amount of intake air in a first embodiment.

Next, reference will be made to a procedure to correct the amount of intake air in this embodiment, in line with a flow chart of FIG. 10. FIG. 10 is a flow chart showing a correction control routine for the amount of intake air. This control routine is a routine which has been beforehand stored in a ROM of the ECU 20, etc., and is carried out by the ECU 20 with a predetermined period.

In the correction control routine of FIG. 10, the ECU 20 first carries out the processing of step S101. In step S101, the ECU 20 determines whether the operating state of the internal combustion engine 1 falls within the EGR operating range. Specifically, the ECU 20 determines whether the operating state, which is specified according to the engine load and the engine speed, falls within any of the ranges a, b, c in FIG. 3.

In cases where a negative determination is made in the above-mentioned step S101, the process of the ECU 20 goes to step S110, in which the ECU 20 corrects the detection value of the air flow meter 72 according to the cylinder injection ratio. Specifically, the ECU 20 performs the correction in such a manner that the higher the cylinder injection ratio, the more the amount of intake air may becomes.

In cases where an affirmative determination is made in the above-mentioned step S101, the process of the ECU 20 goes to step S102. In step S102, the ECU 20 determines whether the operating state of the internal combustion engine 1 falls within the range a in FIG. 3. Specifically, the ECU 20 determines whether the operating state, which is specified according to the engine load and the engine speed, falls within the range a. Here, note that the ranges of the individual degrees of opening, which the throttle valve 71 and the EGR valve 13 can take, respectively, in the range a, may have beforehand been obtained, and it may be determined whether an actual throttle valve opening degree and an actual EGR valve opening degree fall within the above-mentioned ranges, respectively.

In cases where an affirmative determination is made in the above-mentioned step S102, the process of the ECU 20 goes to step S103. In step S103, the ECU 20 calculates the amount of correction according to the degree of opening of the EGR valve 13 and the cylinder injection ratio. For example, the ECU 20 calculates the amount of correction based on the degree of opening of the EGR valve 13, the cylinder injection ratio, and a map as shown in FIG. 7.

In cases where a negative determination is made in the above-mentioned step S102, the process of the ECU 20 goes to step S104. In step S104, the ECU 20 determines whether the operating state of the internal combustion engine 1 falls within the range c in FIG. 3. Specifically, the ECU 20 determines whether the operating state, which is specified according to the engine load and the engine speed, falls within the range c. Here, note that the ranges of the individual degrees of opening, which the throttle valve 71 and the EGR valve 13 can take, respectively, in the range c, may have beforehand been obtained, and it may be determined whether the actual throttle opening degree and the actual EGR valve opening degree fall within the above-mentioned ranges, respectively.

In cases where an affirmative determination is made in the above-mentioned step S104, the process of the ECU 20 goes to step S105. In step S105, the ECU 20 calculates the amount of correction according to the cylinder injection ratio. For example, the ECU 20 calculates the amount of correction based on the cylinder injection ratio and a map as shown in FIG. 8.

In cases where a negative determination is made in the above-mentioned step S104, the operating state of the internal combustion engine 1 falls within the range b in FIG. 3. In that case, the process of the ECU 20 goes to S106, where the ECU 20 determines whether the cylinder injection ratio is lower than the specific ratio rcinj0.

In cases where an affirmative determination is made in the above-mentioned step S106, the process of the ECU 20 goes to step S107. In step S107, the ECU 20 calculates the amount of correction according to the degree of opening of the EGR valve 13 and the cylinder injection ratio. Specifically, the ECU 20 calculates the amount of correction based on the degree of opening of the EGR valve 13, the cylinder injection ratio, and a map as shown in FIG. 9 (a range in which the cylinder injection ratio becomes lower than the specific ratio rcinj0 in FIG. 9).

In cases where a negative determination is made in the above-mentioned step S106, the process of the ECU 20 goes to step S108. In step S108, the ECU 20 calculates the amount of correction according to the cylinder injection ratio. Specifically, the ECU 20 calculates the amount of correction based on the cylinder injection ratio, and a map as shown in FIG. 9 (a range in which the cylinder injection ratio becomes not lower than the specific ratio rcinj0 in FIG. 9).

The process of the ECU 20 goes to step S109 after carrying out the processing of above-mentioned step S103, S105, S107 or S108. In S109, the detection value of the air flow meter 72 is corrected according to the amount of correction calculated in the above-mentioned step S103, S105, S107 or S108.

By carrying out the correction control routine of FIG. 10 by means of the ECU 20 in this manner, it becomes possible to obtain the actual amount of intake air in an accurate manner in a transitional period in which the cylinder injection ratio is changed. As a result, the target values of the various kinds of control parameters can be changed according to the actual amount of intake air, so it becomes possible to suppress a decrease in combustion stability, an increase in exhaust emissions, a change (increase and decrease) in torque, etc.

Here, note that by carrying out the processing of steps S102, S104 and S106 by means of the ECU 20, a determination means according to the present invention is achieved. In addition, by carrying out the processing of steps S103, S105, S107, S108 and S109 by means of the ECU 20, a correction means according to the present invention is achieved.

Incidentally, in this embodiment, there has been described an example in which a correction value has been obtained after carrying out a discrimination process of a range within which the operating state of the internal combustion engine 1 falls, and an identification process which identifies whether the amount of intake air is in an increasing tendency or in a decreasing tendency with respect to the cylinder injection ratio, but the amount of correction may be obtained without carrying out those processes.

For example, the relation between the engine load, the engine speed, the cylinder injection ratio, the degree of opening of the EGR valve 13, and the amount of correction may be made into a map beforehand, and the amount of correction may be obtained by using the engine load, the engine speed, the cylinder injection ratio, and the degree of opening of the EGR valve 13 as parameters.

In addition, although in this embodiment, there has been described an example in which the detection value of the air flow meter 72 is corrected according to the cylinder injection ratio in the transitional period in which the cylinder injection ratio is changed, the target values of the control parameters are corrected according to the cylinder injection ratio. For example, the ECU 20 may correct a target value of a control parameter, instead of correcting the detection value of the air flow meter 72 in step S109 in FIG. 10. In that case, the control parameter to be used as a candidate for correction is one for which a target value is determined according to the detection value of the air flow meter 72.

In cases where the control parameter to be used as a candidate for correction is a total amount of fuel, the total amount of fuel may be corrected by an amount of correction which has the same tendency as that of the amounts of correction shown in the above-mentioned FIG. 7 through FIG. 9. In that case, the total amount of fuel becomes an amount corresponding to the actual amount of intake air, so it becomes possible to converge an air fuel ratio to a target air fuel ratio.

When the target value of the control parameter is corrected in this manner, the target value thus corrected will become a value suitable for the actual amount of intake air. As a result, it becomes possible to suppress the decrease in combustion stability, the increase in exhaust emissions, the change in the torque, etc.

Second Embodiment

Next, reference will be made to a second embodiment of the present invention based on FIG. 11. Here, a construction different from that of the above-mentioned first embodiment will be described, and an explanation of the same construction will be omitted.

The above-mentioned first embodiment has described the example which corrects the detection value of the air flow meter 72 in the transitional period in which the cylinder injection ratio changes, but in this embodiment, reference will be made to an example in which the detection value of the air flow meter 72 is corrected in a transitional period in which the degree of opening of the EGR valve 13 changes together with the cylinder injection ratio.

For example, in cases where the operating state of the internal combustion engine 1 shifts from an EGR non-operating range to an EGR operating range, the actual degree of opening of the EGR valve 13 is not immediately converged to a target degree of opening of the EGR valve. Moreover, immediately after the actual degree of opening of the EGR valve 13 has been converged to the target degree of opening of the EGR valve, a transportation delay will occur by the time when an EGR gas reaches from the exhaust passage 80 to the intake passage 70, so the amount of EGR gas is not immediately converged to a target amount of EGR gas.

In such a case, an error occurs between an amount of intake air calculated according to the method as described in the above-mentioned first embodiment and an actual amount of intake air. Accordingly, in this embodiment, a convergence ratio of the actual amount of EGR gas with respect to the target amount of EGR gas (=(the actual amount of EGR gas)/(the target amount of EGR gas)), or a convergence ratio of an actual EGR ratio with respect to a target EGR ratio (=(an actual EGR ratio)/(a target EGR ratio)), is calculated, and an amount of correction for the amount of intake air is modified by the convergence ratio thus obtained.

Here, the larger an amount of change of the degree of opening of the EGR valve 13, the larger a response delay of the EGR valve 13 becomes. The lower the engine speed, the larger the transportation delay of the EGR gas becomes. As a result, each convergence ratio can be calculated based on the amount of change of the degree of opening of the EGR valve 13 and the engine speed.

However, the longer the time elapsed from an operation start time of the EGR valve 13 (or a time when a control signal is outputted from the ECU 20 to the EGR valve 13), the higher the above-mentioned convergence ratios become. For this reason, it is preferable that each convergence ratio be calculated based on the amount of change of the degree of opening, the engine speed, and the elapsed time.

When a convergence ratio is calculated in this manner, the ECU 20 multiplies the amount of correction, which has been calculated according to the method described in the above-mentioned first embodiment, by the convergence ratio, and corrects the amount of intake air by using the result of the calculation thus obtained as a final amount of correction.

Hereinafter, reference will be made to a procedure to correct the amount of intake air in this embodiment, in line with FIG. 11. FIG. 11 is a flow chart showing a correction control routine in this embodiment. Here, note that in FIG. 11, the same symbols are attached to the same processes as those in the correction control routine of the first embodiment (see FIG. 10).

Figure 11:
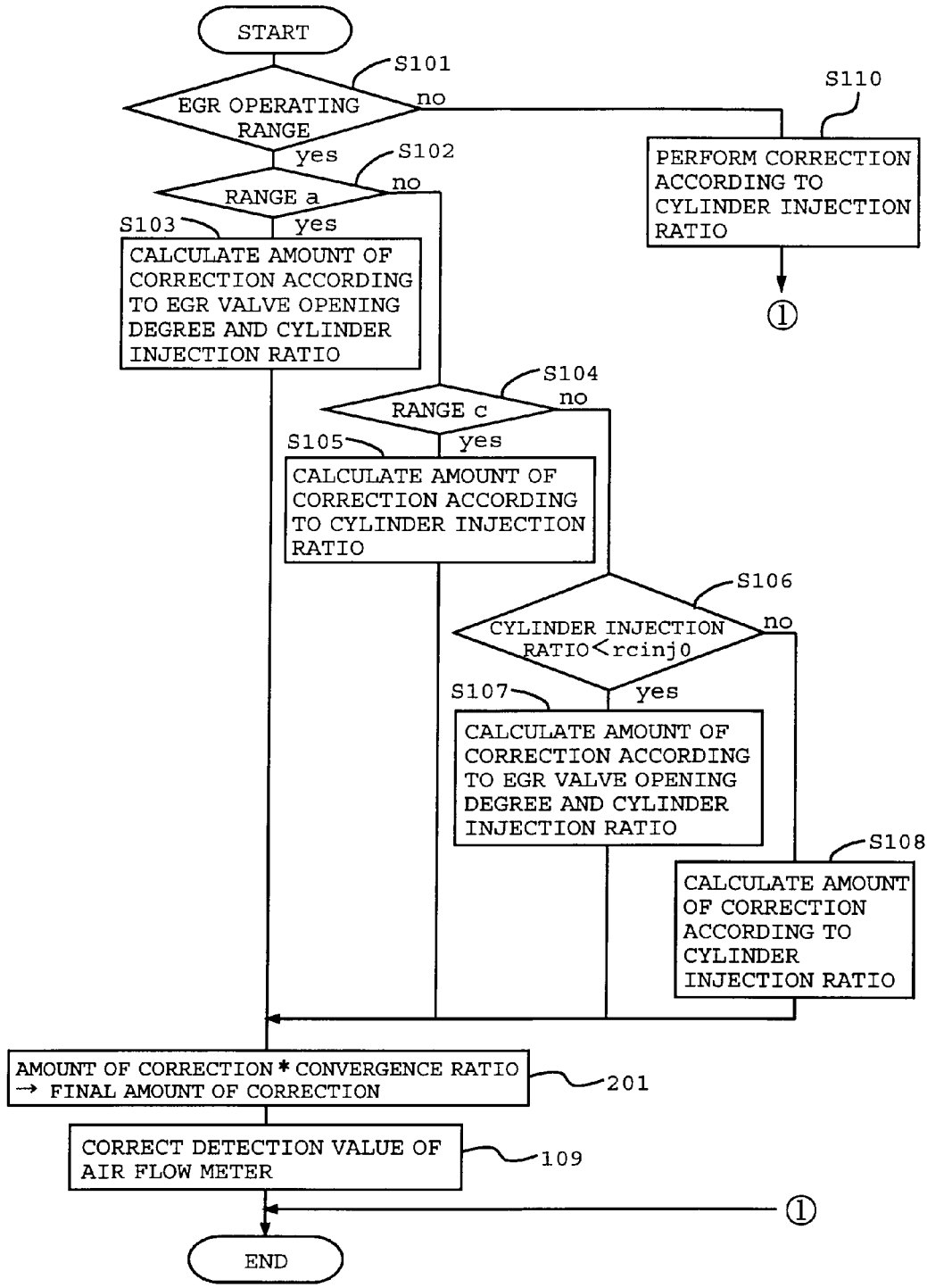
FIG. 11 is a flow chart showing a correction control routine for correction of an amount of intake air in a second embodiment.

The difference between the correction control routine of FIG. 11 and the correction control routine of FIG. 10 is the processing of S201 which is carried out before step S109. That is, the ECU 20 carries out the processing of S201, after carrying out the processing of S103, S105, S107, or S108. In step S201, the ECU 20 calculates the final amount of correction by multiplying the amount of correction calculated in step S103, S105, S107, or S108 by the convergence ratio. Then, in step S109, the ECU 20 corrects the detection value of the air flow meter 72 by using the final amount of correction thus calculated in the above-mentioned step S201.

By carrying out the correction control routine of FIG. 11 by means of the ECU 20 in this manner, it becomes possible to obtain the actual amount of intake air in an accurate manner even in cases where the response delay of the EGR valve 13 or the transportation delay of the EGR gas have occurred.

Although in the above-mentioned first and second embodiments, there have been described examples in which the detection value of the air flow meter 72 is corrected, the amount of EGR gas calculated based on the detection value of the air flow meter 72 can also be corrected. In that case, the ECU 20 should just correct the amount of EGR gas based on the increasing or decreasing tendency of the amount of EGR gas shown in FIG. 4 through FIG. 6. Moreover, in cases where the amount of EGR gas thus corrected is different from a target value thereof, it also becomes possible for the ECU 20 to converge the amount of EGR gas to the target value by correcting a target value of a control parameter.

DESCRIPTION OF THE REFERENCE NUMERALS AND SYMBOLS 1 internal combustion engine
2 cylinder
5 first fuel injection valve
6 spark plug
7 intake port
8 exhaust port
9 intake valve
10 exhaust valve
11 second fuel injection valve
12 EGR passage
13 EGR valve
20 ECU
70 intake passage
71 throttle valve
72 air flow meter

The invention claimed is:

1. A control system of an internal combustion engine comprising:
a first fuel injection valve that injects fuel into a cylinder of the internal combustion engine;
a second fuel injection valve that injects fuel into an intake port of the internal combustion engine;
a throttle valve that is arranged in an intake passage of the internal combustion engine;
an EGR passage that introduces an EGR gas from an exhaust passage of the internal combustion engine to the intake passage at a location downstream of said throttle valve;
an EGR valve that is arranged in the EGR passage;
an obtaining unit that obtains an amount of intake air in the internal combustion engine;
a determination unit that determines, based on a cylinder injection ratio which is a ratio of an amount of fuel injected from said first fuel injection valve to a total amount of fuel injected from said first fuel injection valve and said second fuel injection valve, whether the amount of intake air is in an increasing tendency or in a decreasing tendency with respect to a change in the cylinder injection ratio, when said EGR valve is open; and
a correction unit that corrects the amount of intake air obtained by said obtaining unit, according to a result of the determination of said determination unit.

2. The control system of an internal combustion engine according to claim 1, wherein if the cylinder injection ratio is lower than a specific ratio when a degree of opening of said throttle valve is not more than a predetermined throttle opening degree and when a degree of opening of said EGR valve is not less than a predetermined EGR valve opening degree, said determination unit makes a determination that the amount of intake air is in the decreasing tendency with respect to an increase in the cylinder injection ratio.

3. The control system of an internal combustion engine according to claim 1, wherein if the cylinder injection ratio is not less than a specific ratio when a degree of opening of said throttle valve is not more than a predetermined throttle opening degree and when a degree of opening of said EGR valve is not less than a predetermined EGR valve opening degree, said determination unit makes a determination that the amount of intake air is in the increasing tendency with respect to an increase in the cylinder injection ratio.

4. The control system of an internal combustion engine according to claim 1, further comprising:
a storage unit that stores an operating range in which the increasing or decreasing tendency of the amount of intake air with respect to a change in the cylinder injection ratio is reversed at a specific cylinder injection ratio;
wherein when the operating state of said internal combustion engine falls within the operating range stored in said storage unit, said determination unit determines whether the amount of intake air is in the increasing tendency or in the decreasing tendency, by making a determination as to whether the cylinder injection ratio is lower than the specific cylinder injection ratio.

5. The control system of an internal combustion engine according to claim 1, further comprising:
a changing unit that changes a target value of a control parameter related to the operating state of said internal combustion engine, according to the amount of intake air corrected by said correction unit.

6. The control system of an internal combustion engine according to claim 5, wherein said control parameter is at least one of a degree of opening of said throttle valve, a degree of opening of said EGR valve, said total amount of fuel, said cylinder injection ratio, ignition timing, and a valve opening characteristic of an intake valve.

7. A control system of an internal combustion engine comprising:
a first fuel injection valve that injects fuel into a cylinder of the internal combustion engine;
a second fuel injection valve that injects fuel into an intake port of the internal combustion engine;
a throttle valve that is arranged in an intake passage of the internal combustion engine;
an EGR passage that introduces an EGR gas from an exhaust passage of the internal combustion engine to the intake passage at a location downstream of said throttle valve;
an EGR valve that is arranged in the EGR passage;
an obtaining unit that obtains an amount of intake air in the internal combustion engine;
a setting unit that sets a target value of a control parameter related to an operating state of said internal combustion engine, according to the amount of intake air obtained by said obtaining unit;
a determination unit that determines, based on a cylinder injection ratio which is a ratio of an amount of fuel injected from said first fuel injection valve to a total amount of fuel injected from said first fuel injection valve and said second fuel injection valve, whether the amount of intake air is in an increasing tendency or in a decreasing tendency with respect to a change in the cylinder injection ratio, when said EGR valve is open; and
a correction unit that corrects the target value of the control parameter set by said setting unit, according to a result of the determination of said determination unit.

8. The control system of an internal combustion engine according to claim 7, wherein if the cylinder injection ratio is lower than a specific ratio when a degree of opening of said throttle valve is not more than a predetermined throttle opening degree and when a degree of opening of said EGR valve is not less than a predetermined EGR valve opening degree, said determination unit makes a determination that the amount of intake air is in the decreasing tendency with respect to an increase in the cylinder injection ratio.

9. The control system of an internal combustion engine according to claim 7, wherein if the cylinder injection ratio is not less than a specific ratio when a degree of opening of said throttle valve is not more than a predetermined throttle opening degree and when a degree of opening of said EGR valve is not less than a predetermined EGR valve opening degree, said determination unit makes a determination that the amount of intake air is in the increasing tendency with respect to an increase in the cylinder injection ratio.

10. The control system of an internal combustion engine according to claim 7, further comprising:
a storage unit that stores an operating range in which the increasing or decreasing tendency of the amount of intake air with respect to a change in the cylinder injection ratio is reversed at a specific cylinder injection ratio;
wherein when the operating state of said internal combustion engine falls within the operating range stored in said storage unit, said determination unit determines whether the amount of intake air is in the increasing tendency or in the decreasing tendency, by making a determination as to whether the cylinder injection ratio is lower than the specific cylinder injection ratio.

11. A control system of an internal combustion engine comprising:
a first fuel injection valve that injects fuel into a cylinder of the internal combustion engine;
a second fuel injection valve that injects fuel into an intake port of the internal combustion engine;
a throttle valve that is arranged in an intake passage of the internal combustion engine;
an EGR passage that introduces an EGR gas from an exhaust passage of the internal combustion engine to the intake passage at a location downstream of said throttle valve;
an EGR valve that is arranged in the EGR passage;
a first obtaining unit that obtains an amount of intake air in the internal combustion engine;
a second obtaining unit that obtains an amount of EGR gas based on the amount of intake air obtained by said first obtaining unit;
a determination unit that determines, based on a cylinder injection ratio which is a ratio of an amount of fuel injected from said first fuel injection valve to a total amount of fuel injected from said first fuel injection valve and said second fuel injection valve, whether the amount of EGR gas is in an increasing tendency or in a decreasing tendency with respect to a change in the cylinder injection ratio, when said EGR valve is open; and
a correction unit that corrects the amount of EGR gas obtained by said second obtaining unit, according to a result of the determination of said determination unit.

* * * * *